(12) United States Patent
Ogawa

(10) Patent No.: US 7,447,583 B2
(45) Date of Patent: Nov. 4, 2008

(54) VEHICLE CONTROL APPARATUS

(75) Inventor: Hiroyuki Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 82 days.

(21) Appl. No.: 11/313,797

(22) Filed: Dec. 22, 2005

(65) Prior Publication Data

US 2006/0167611 A1 Jul. 27, 2006

(30) Foreign Application Priority Data

Jan. 26, 2005 (JP) ............................. 2005-018334

(51) Int. Cl.
- *G06F 17/00* (2006.01)
- *G05D 1/00* (2006.01)
- *G08G 1/00* (2006.01)
- *G01S 13/00* (2006.01)

(52) U.S. Cl. ........................... 701/53; 701/96; 180/167; 340/904; 342/70

(58) Field of Classification Search ................... 701/51, 701/53, 55, 56, 93, 94, 95, 96, 36, 41; 180/167, 180/168, 169, 170; 340/901, 903, 904, 463, 340/467; 342/70, 71, 72

See application file for complete search history.

(56) References Cited

U.S. PATENT DOCUMENTS

| | | | | |
|---|---|---|---|---|
| 5,839,534 A * | 11/1998 | Chakraborty et al. | ....... | 180/169 |
| 5,959,572 A * | 9/1999 | Higashimata et al. | ......... | 342/70 |
| 6,076,622 A * | 6/2000 | Chakraborty et al. | ....... | 180/169 |
| 6,185,499 B1 * | 2/2001 | Kinoshita et al. | ............. | 701/96 |
| 6,192,309 B1 * | 2/2001 | Prestl et al. | ................... | 701/93 |
| 6,442,467 B1 * | 8/2002 | Schuler et al. | ................ | 701/51 |
| 6,724,300 B2 * | 4/2004 | Miyakoshi et al. | .......... | 340/435 |
| 7,160,227 B2 * | 1/2007 | Kuwahara et al. | ........... | 477/116 |
| 2002/0026276 A1 * | 2/2002 | Hattori et al. | ................. | 701/96 |
| 2002/0042672 A1 * | 4/2002 | Shiiba et al. | ................... | 701/65 |
| 2005/0125137 A1 * | 6/2005 | Shiiba et al. | ................... | 701/96 |

FOREIGN PATENT DOCUMENTS

JP 10-306872 11/1998

* cited by examiner

*Primary Examiner*—Jack W Keith
*Assistant Examiner*—Edward Pipala
(74) *Attorney, Agent, or Firm*—Oblon, Spivak, McClelland, Maier & Neustadt, P.C.

(57) ABSTRACT

An ECU executes a program including a step of outputting a downshift command to an automatic transmission on conditions that a following distance control is being executed, that an acceleration pedal opening degree is detected, and that the detected acceleration pedal opening degree is greater than an opening degree threshold (A) set to be smaller than an opening degree threshold (corresponding to a downshift speed change line) not during execution of the following distance control.

2 Claims, 5 Drawing Sheets

VEHICLE CONTROL APPARATUS

This nonprovisional application is based on Japanese Patent Application No. 2005-018334 filed with the Japan Patent Office on Jan. 26, 2005 the entire contents of which are hereby incorporated by reference.

BACKGROUND OF THE INVENTION

1. Field of the Invention

The present invention relates to a vehicle control apparatus equipped with an automatic transmission and, particularly, to a control apparatus for immediately responding to a driver's intention to effect acceleration in a vehicle having a mechanism for keeping a following distance between an own vehicle and a preceding vehicle coincident with a target distance.

2. Description of the Background Art

An automatic transmission mounted to a vehicle is connected to an engine through a torque converter and the like, includes a speed change mechanism having a plurality of power transmission paths, and is formed to automatically switch between the power transmission paths, i.e., switch between speed change ratios (traveling speed gears) on the basis of an acceleration pedal opening degree (throttle opening degree) and a vehicle speed. In general, a vehicle having an automatic transmission is provided with a shift lever to be operated by a driver, speed change positions (e.g., a reverse traveling position, a neutral position, and a forward traveling position) are set on the basis of operation of the shift lever. Within the speed change positions set in this way (normally, within the forward traveling position), an automatic speed change control is carried out.

Normally, in the forward traveling position selected during traveling of the vehicle, a speed change control is executed on the basis of speed change lines (speed change maps) determined by the vehicle speed and the throttle opening degree. Such speed change lines are set separately in a case of upshift and in a case of downshift. If the same speed change line is used in the case of the upshift and the case of the downshift, when the vehicle speed increases to effect the upshift, for example, the speed is reduced and the speed change line is crossed to execute the downshift. When this downshift is executed, the vehicle speed increases again to effect the upshift to cause a hunting phenomenon in which the upshift and the downshift are repeated in the vicinity of the speed change line. In order to avoid this hunting phenomenon, while an upshift speed change line is made agree with a fuel economy optimum line or an emission cleanup optimum line, a downshift speed change line is set so that hysteresis is secured on a lower-speed side than the upshift speed change line, for example.

There is also a system called an automatic follow-up system or the like with which a following distance between the own vehicle and the preceding vehicle is kept coincident with a target following distance and the vehicle travels at a set cruising speed. With such a system, even if a speed of the preceding vehicle changes, a driving force and a braking force of the vehicle are controlled so as to maintain the set target following distance.

Japanese Patent Laying-Open No. 10-306872 discloses an automatic shift down device related to such a technique. This automatic shift down device effects downshift of an automatic transmission when an actual following distance between an own vehicle and a preceding vehicle traveling ahead of the own vehicle is shorter than a target following distance based on a vehicle speed and includes a following distance detector for detecting the following distance between the own vehicle and the preceding vehicle, a vehicle speed detector for detecting a speed of the own vehicle, an accelerator operation detector for detecting operation of an accelerator by a driver, and a controller for effecting the downshift of the automatic transmission when a detection value of the following distance detector is smaller than the target following distance based on the vehicle speed and the accelerator operation detector detects operation of the accelerator in a returning direction.

With this automatic shift down device for the vehicle, the controller effects the downshift of the automatic transmission to effect deceleration when the detection value of the following distance detector is smaller than the target following distance based on the vehicle speed and the accelerator operation detector detects operation of the accelerator in a returning direction, i.e., in synchronization with sensing of the driver's intension to effect deceleration. In other words, this controller determines whether the driver effects deceleration to obtain a safe following distance or wants to effect acceleration for overrunning and overtaking on the basis of whether or not the accelerator has been operated in the returning direction when the detection value of the following distance detector is smaller than the target following distance based on the vehicle speed. In a case of deceleration, i.e., when the accelerator operation detector has detected operation of the accelerator in the returning direction, the downshift of the automatic transmission is effected. As a result, deceleration by the automatic transmission is effected until a foot brake is depressed and deceleration by the foot brake and the automatic transmission is effected after the depression to thereby perform safe and reliable braking without delay in response. On the other hand, when the accelerator operation detector has not detected operation of the accelerator in the returning direction, it is determined that the driver is not effecting deceleration but effecting acceleration for overrunning or overtaking. As a result, acceleration becomes possible and overtaking or the like can be carried out without a hitch.

However, in the automatic shift down device disclosed in Japanese Patent Laying-Open No. 10-306872, if the driver depresses the acceleration pedal to effect acceleration so as to overtake the preceding vehicle during an automatic follow-up control, the downshift is not effected. Therefore, it is impossible to immediately accelerate the vehicle and it takes much time to overtake. Moreover, when the downshift is effected while passing the down shift speed change line by depression of the acceleration pedal, a delay time is caused until the downshift of the automatic transmission is effected after the driver demands acceleration and the driver's intention to effect acceleration cannot sufficiently be realized.

SUMMARY OF THE INVENTION

It is an object of the present invention to provide a vehicle control apparatus for realizing a driver's intention to effect acceleration without causing a delay time in a vehicle in which at least an automatic transmission is controlled to make a following distance between an own vehicle and a preceding vehicle coincide with a target following distance.

According to the present invention, there is provided a vehicle control apparatus including a following distance control unit to control at least an automatic transmission so that a following distance between an own vehicle and a preceding vehicle coincides with a target following distance, an operation amount detection unit to detect an operation amount with regard to an output of a power source in an operation unit operated by a driver, a speed change determination unit to make a determination to execute a speed change in the automatic transmission on the basis of the operation amount detected by the operation amount detection unit and a predetermined determination value, and a change unit to change the determination value during execution of a following distance control by the following distance control unit.

According to the present invention, if the driver wants to overtake the preceding vehicle during traveling in a traveling lane of an expressway having an overtaking lane and during execution of the following distance control by the following distance control unit, the driver depresses an acceleration pedal as an example of the operation unit with regard to the output of the power source. In this case, a change is made so that downshift is executed at a lower acceleration pedal opening degree than an acceleration pedal opening degree (throttle opening degree) on a normal downshift speed change line. Thus, even during execution of the following distance control for following the preceding vehicle (normally, this control is on the basis of a premise that the vehicle follows and therefore it is not assumed that the vehicle overtakes the preceding vehicle), the downshift is executed by only depressing the acceleration pedal by a small amount by the driver to thereby immediately generate a large driving force required to overtake. At this time, the so-called power-on downshift is executed. The downshift is effected early and delay of downshift speed change time can be avoided to immediately respond to a driver's intention to effect acceleration and a rise of the revolution number of the power source (engine) can be prevented. Moreover, because the speed change control is executed in a state of a low revolution number of the power source (engine), it is possible to suppress increase in heat loads on components in frictional engagement with each other of the automatic transmission. As a result, it is possible to provide the vehicle control apparatus for realizing the driver's intention to effect acceleration without causing a delay time in a vehicle in which at least the automatic transmission is controlled so that the following distance between the own vehicle and the preceding vehicle coincides with the target following distance.

Preferably, the speed change determination unit makes a determination to execute a downshift speed change of the automatic transmission when the operation amount detected by the operation amount detection unit exceeds the predetermined determination value. The change unit makes a change to reduce the determination value during execution of the following distance control by the following distance control unit.

According to the present invention, the determination value of the operation amount (e.g., the acceleration pedal opening degree) at which the downshift speed change is executed is changed to be reduced so that the downshift speed change becomes more likely to be executed to thereby effect the large driving force without causing the time delay.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
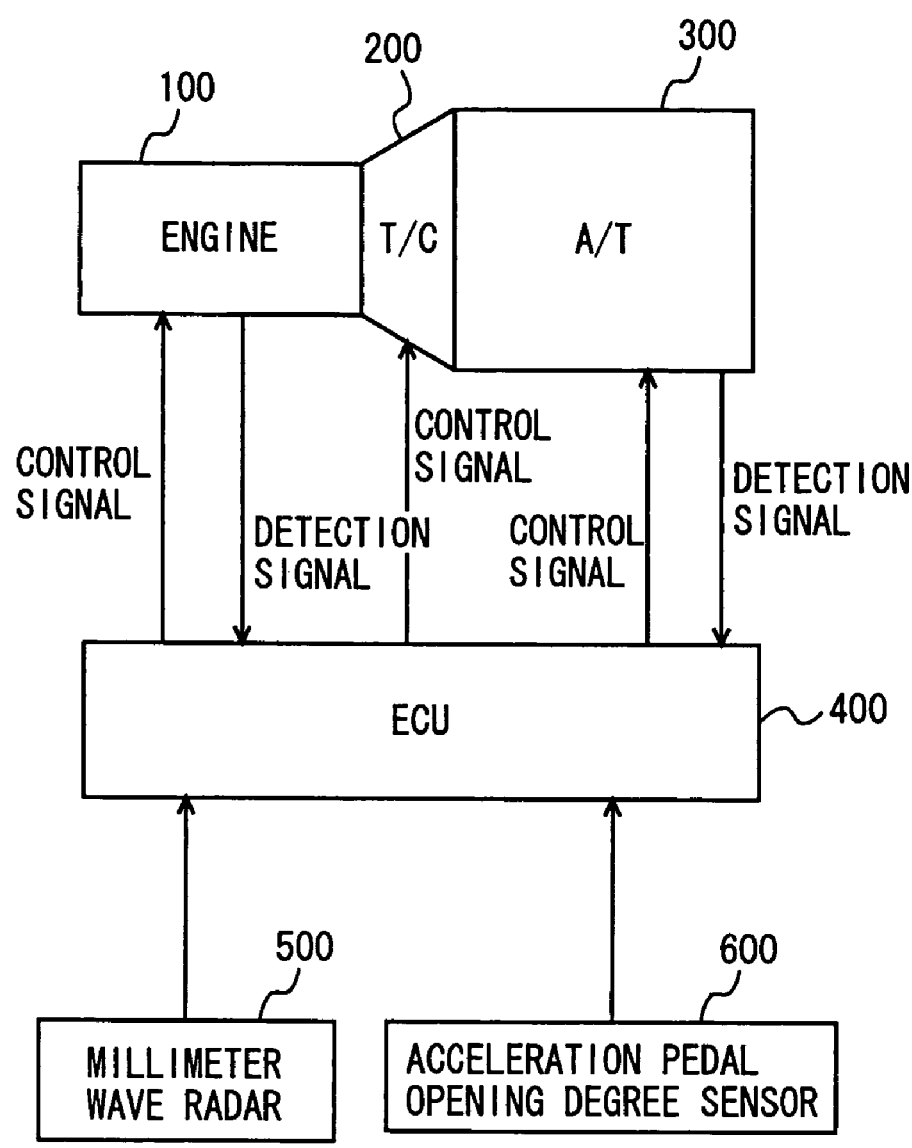
FIG. 1 is a control block diagram including an ECU that is a vehicle control apparatus according to the present embodiment.

An embodiment of the present invention will be described below with reference to the drawings. In the following description, the same parts are denoted by the same reference numerals. The same parts also have the same names and functions. Therefore, they will not be described in detail repeatedly.

With reference to FIG. 1, a power train of a vehicle including an ECU that is a control apparatus according to the embodiment of the present invention will be described.

As shown in FIG. 1, this vehicle includes an engine 100, a torque converter 200, an automatic transmission 300, an ECU (Electronic Control Unit) 400 for controlling them, a millimeter wave radar 500 for inputting a signal indicating a distance between an own vehicle and a preceding vehicle to ECU, and an acceleration pedal opening degree sensor 600 for inputting a signal indicating an opening degree of an acceleration pedal to ECU 400.

Although a speed change control applied to the power train having engine 100, torque converter 200, and automatic transmission 300 as shown in FIG. 1 will be described in the following description, the present invention is not limited to this. The speed change control may be applied to a power train including a motor, a motor generator, and the like instead of the power train formed of engine 100, torque converter 200, and automatic transmission 300.

ECU 400 outputs control signals such as a throttle opening degree command signal and receives detection signals such as an engine revolution number signal to and from engine 100. ECU 400 outputs a control signal for commanding a lock-up clutch of torque converter 200 to be engaged or disengaged (including a slip). ECU 400 outputs a control signal that is a hydraulic command signal to automatic transmission 300, and detection signals such as an output shaft rotation number signal is input to ECU 400 from automatic transmission 300.

Millimeter wave radar 500 is a sensor for detecting a current following distance in order to realize a follow-up function of keeping the following distance between the own vehicle and the preceding vehicle coincident with a target following distance, and the detected following distance is input to ECU 400. The sensor for detecting the following distance is not limited to the millimeter wave radar. For example, the sensor may be a radar not limited to such a millimeter wave and may be other sensors.

When a button of automatic cruise with a follow-up function is pushed by a driver, ECU 400 controls a driving force and a braking force of the vehicle so that the following distance from the preceding vehicle does not become shorter than the predetermined target following distance (the follow-up function) while maintaining a set cruising speed even if the acceleration pedal is not depressed (an automatic cruising function). At this time, the follow-up function takes precedence over the cruising speed set by the automatic cruising function. In other words, if a vehicle speed of the preceding vehicle reduces and the following distance coincides with the target following distance, the cruising speed of the automatic cruising function is reduced to keep the target following distance so that the following distance does not become shorter.

Acceleration pedal opening degree sensor 600 detects the opening degree of the acceleration pedal operated by the driver. Instead of this acceleration pedal opening degree sensor 600, a throttle valve opening degree sensor may be employed.

Figure 2:
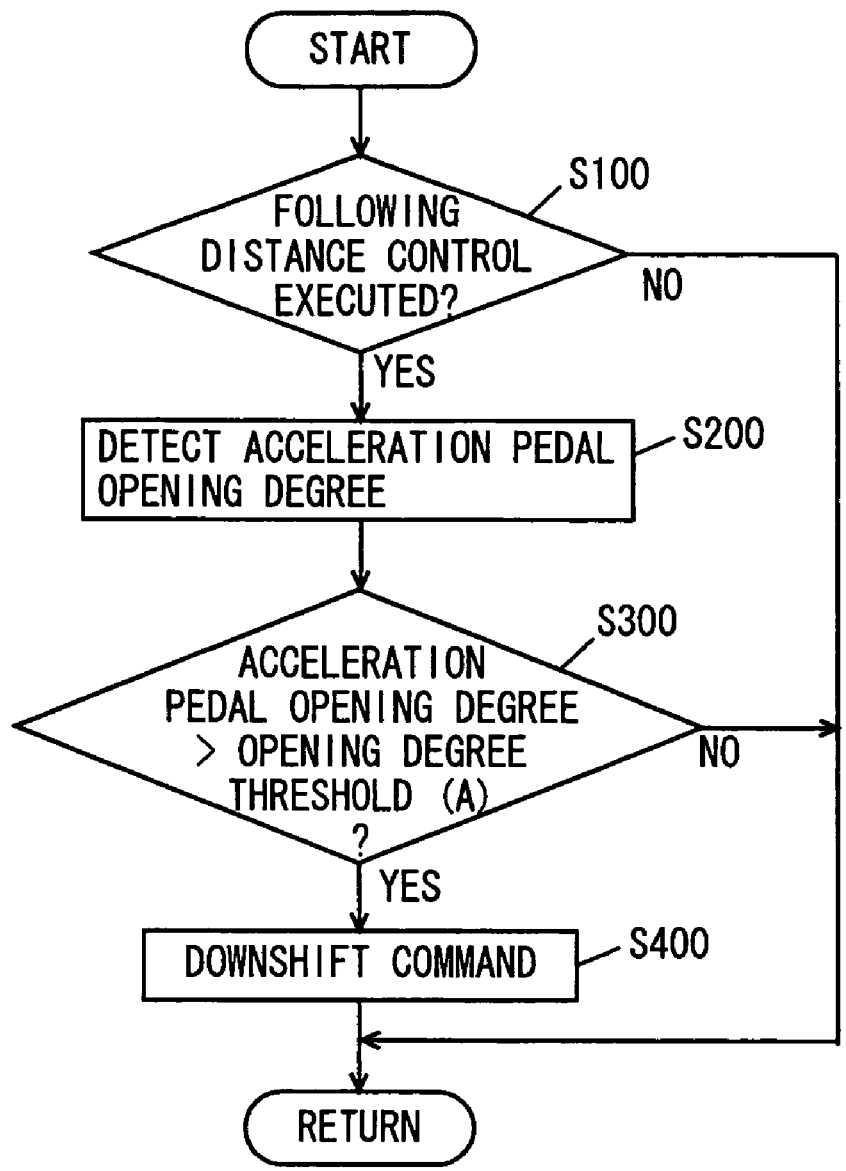
FIG. 2 is a flow chart showing a control structure of a program executed in the ECU.

With reference to FIG. 2, a control structure of a program executed in ECU 400 which is a control device according to the embodiment will be described.

In step (hereinafter abbreviated as S) 100, ECU 400 determines whether or not a following distance control is being executed. At this time, ECU 400 determines whether or not the following distance control is being executed on the basis of whether or not the button of the automatic cruise with the follow-up function is pushed by the driver. If the following distance control is being executed (YES in S100), the process proceeds to S200. If not (NO in S100), the process ends.

In S200, ECU 400 detects the opening degree of the acceleration pedal. At this time, ECU 400 detects the opening degree of the acceleration pedal on the basis of the signal input from the acceleration pedal opening degree sensor 600.

In S300, ECU 400 determines whether or not the opening degree of the acceleration pedal is greater than an opening degree threshold (A). This opening degree threshold (A) may be a constant or a value defined by a map or the like and is set to be smaller at least during execution of the following distance control than that not during execution of the following distance control. As parameters of the opening degree threshold (A) in a case where the threshold is set by the map or the like, an acceleration, an acceleration change rate, the vehicle speed, a rotation number of an output shaft of automatic transmission 300, a revolution number of engine 100, an amount of a load on engine 100, an acceleration change prospect value (a future acceleration change predicted value obtained from road surface unevenness information and a travel history), and the like can be considered. If the opening degree of the acceleration pedal is greater than the opening degree threshold (A) (YES in S300), the process proceeds to S400. If not (NO in S300), this process ends.

In S400, ECU 400 outputs a downshift command signal to automatic transmission 300.

Operation of ECU 400 that is the control device according to the present embodiment, based on the above structure and flow chart, will be described.

For example, a case in which the automatic cruising function with the follow-up function is executed and the driver of the vehicle traveling in a traveling lane of an expressway having two lanes in one direction wants to overtake the preceding vehicle will be described. Incidentally, assumptions are made that a vehicle speed at this time is 80 to 100 Km/h and that the vehicle is cruising at a high speed in the fifth speed change gear of automatic transmission 300.

Figure 3:
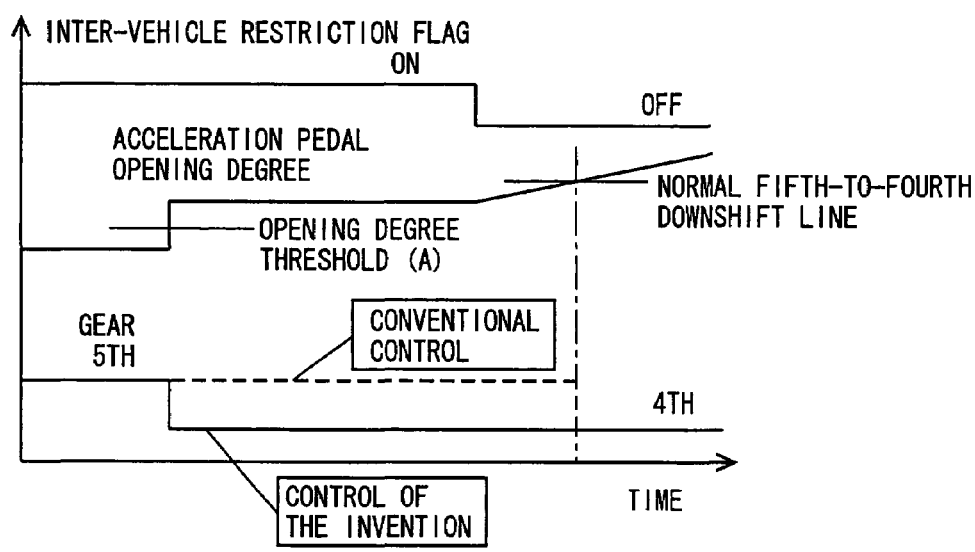
FIG. 3 is a timing chart showing changes over time of an inter-vehicle restriction flag, an acceleration pedal opening degree, and a gear.

If the driver depresses the acceleration pedal because he/she wants to overtake the preceding vehicle, downshift is executed when the driver depresses the acceleration pedal less than normal (when the automatic cruising function with the follow-up function is not executed) (YES in S300, S400). In other words, as shown in FIG. 3, if the inter-vehicle restriction flag (this flag is in an ON state during execution of the automatic cruising function with the follow-up function) is in the ON state (YES in S100), the downshift of the gear from the fifth gear to the fourth gear is effected at the opening degree threshold (A) which is a smaller opening degree than an acceleration pedal opening degree on a normal fifth-to-fourth downshift speed change line. In a conventional control, as shown in a dotted line in FIG. 3, the downshift of the gear from the fifth gear to the fourth gear is effected after a lapse of a delay time. On the other hand, according to the control of the present invention, when the acceleration pedal opening degree greater than the opening degree threshold (A) set to be smaller than normal is detected (YES in S300), the downshift is effected (S400). As a result, in a case in which the automatic cruising function with the follow-up function is being executed as in the conventional art, the downshift is effected at the smaller acceleration pedal opening degree as compared with a case in which the automatic cruising function with the follow-up function is not being executed to thereby generate a large driving force to realize a feeling of acceleration demanded by the driver.

Figure 4:
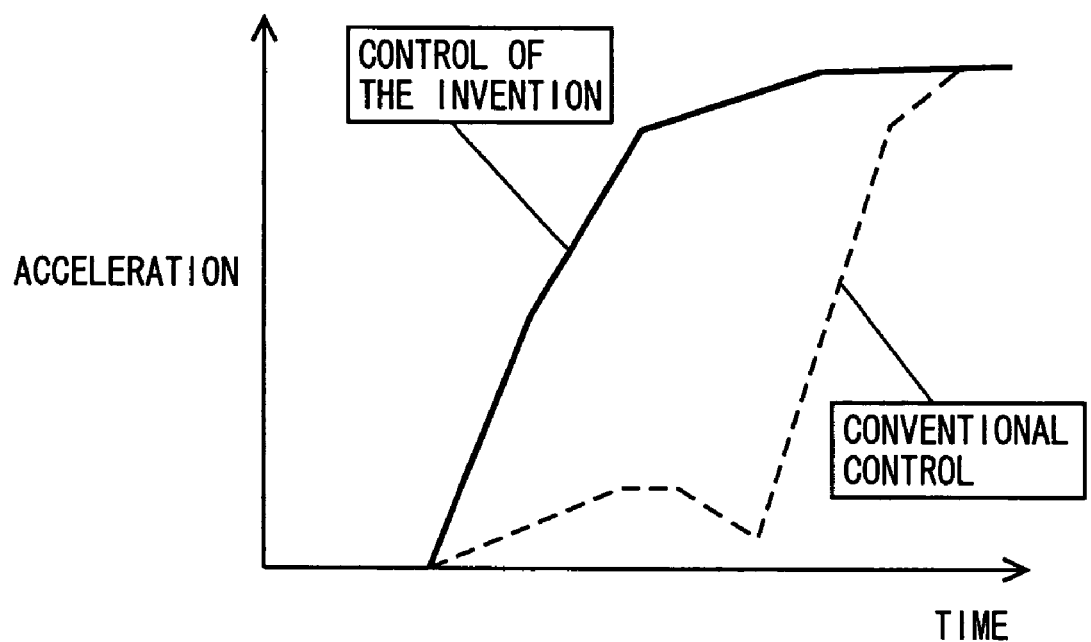
FIG. 4 is a timing chart showing a change over time of an acceleration acting on a vehicle.

FIG. 4 shows change over time of the acceleration. In the conventional control, the acceleration does not increase unless the acceleration pedal is depressed to an acceleration pedal opening degree corresponding to a fifth-to-fourth downshift speed change line not during execution of the automatic cruising function with the follow-up function. In other words, after the lapse of the delay time, the acceleration increases. On the other hand, in the control of the present invention, as shown in a solid line in FIG. 4, a desired acceleration can be effected without causing the delay time.

By effecting the large driving force by the downshift in this manner, the large acceleration is provided to the vehicle without causing the time delay. This will be described by using FIGS. 5 and 6.

Figure 5:
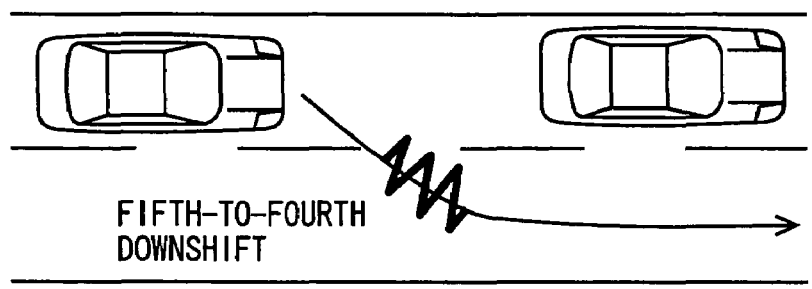
FIG. 5 shows a state of overtaking of a preceding vehicle in a conventional control.
Figure 6:
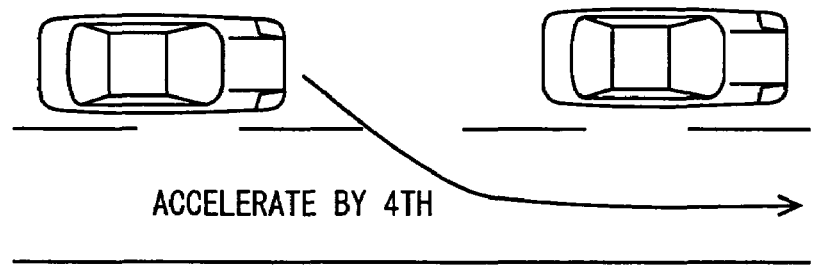
FIG. 6 shows a state of overtaking of a preceding vehicle in a control of the present invention.

As show in FIG. 5, in the conventional control, during execution of the automatic cruising function with the follow-up function, the downshift is executed and the acceleration increases after the vehicle turns into an overtaking lane in order to overtake the preceding vehicle. In other words, after depressing the acceleration pedal and operating a steering wheel to turn into the overtaking lane (here, an assumption is made that a timing after the lapse of the delay time is after a timing of this lane change), the downshift is effected and the acceleration increases. On the other hand, as shown in FIG. 6, in the control of the present invention, because the downshift is effected without the delay time, the downshift is executed and the acceleration increases before the vehicle turns into the overtaking lane in order to overtake the preceding vehicle. As a result, it is possible to swiftly effect acceleration since the lane change to thereby overtake the preceding vehicle.

As described above, with ECU that is the control device according to the present embodiment, in the vehicle controlled so that the following distance between the own vehicle and the preceding vehicle is made coincident with the target following distance, it is determined that a driver intends to overtake the preceding vehicle when the driver depresses the acceleration pedal. In this case, in the case in which the follow-up control is being executed, as compared with the case in which the follow-up control is not being executed, the downshift is executed at the smaller acceleration pedal opening degree. In this way, it is possible to execute the downshift earlier than normal (when the follow-up control is not being executed). As a result, the downshift is executed immediately in response to a driver's demand for overtaking (demand for acceleration) to thereby realize a large acceleration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle control apparatus comprising:

a following distance control unit configured to control at least an automatic transmission so that a following distance between the vehicle and a preceding vehicle coincides with a target following distance;

an accelerator pedal opening degree detection unit configured to detect an opening degree of an acceleration pedal;

a speed change determination unit configured to make a determination to execute a speed change in said automatic transmission on the basis of the opening degree of an acceleration pedal detected by said accelerator pedal opening degree detection unit and a predetermined determination value; and a change unit configured to reduce said determination value while following distance control is performed by said following distance control unit, wherein said speed change determination unit is configured to make a determination to execute a downshift speed change of said automatic transmission when the opening degree of the acceleration pedal detected by said accelerator pedal opening degree detection unit exceeds the predetermined determination value.

2. A vehicle control apparatus comprising:

following distance control means for controlling at least an automatic transmission so that a following distance between the vehicle and a preceding vehicle coincides with a target following distance;

acceleration pedal opening degree detection means for detecting an opening degree of an accelerator pedal;

speed change determination means for making a determination to execute a speed change in said automatic transmission on the basis of the opening degree of an accelerator pedal detected by said acceleration pedal opening degree detection means and a predetermined determination value; and change means for reducing said determination value while following distance control is performed by said following distance control means, wherein said speed change determination means includes means for making a determination to execute a downshift speed change of said automatic transmission when the opening degree of an accelerator pedal detected by said acceleration pedal opening degree detection means exceeds the predetermined determination value.

* * * * *